(12) United States Patent
Ahmad

(10) Patent No.: US 10,062,106 B2
(45) Date of Patent: Aug. 28, 2018

(54) MENU SHARING SYSTEMS AND METHODS FOR TELEDINING

(71) Applicant: Mirza M. Ahmad, Great Falls, VA (US)

(72) Inventor: Mirza M. Ahmad, Great Falls, VA (US)

(*) Notice: Subject to any disclaimer, the term of this patent is extended or adjusted under 35 U.S.C. 154(b) by 302 days.

(21) Appl. No.: 14/989,537

(22) Filed: Jan. 6, 2016

(65) Prior Publication Data

US 2016/0117762 A1    Apr. 28, 2016

Related U.S. Application Data

(63) Continuation-in-part of application No. 13/839,229, filed on Mar. 15, 2013.

(51) Int. Cl.
G06Q 30/00 (2012.01)
G06Q 30/06 (2012.01)
G06Q 50/12 (2012.01)

(52) U.S. Cl.
CPC ......... *G06Q 30/0641* (2013.01); *G06Q 50/12* (2013.01)

(58) Field of Classification Search
CPC .......................... G06Q 30/0641; G06Q 50/12
USPC ..................................... 705/15, 16
See application file for complete search history.

(56) References Cited

U.S. PATENT DOCUMENTS

| | | |
|---|---|---|
| 5,845,263 A | 12/1998 | Camaisa et al. |
| 6,636,835 B2 | 10/2003 | Ragsdale-Elliott et al. |
| 6,844,893 B1 | 1/2005 | Miller et al. |
| 7,116,350 B2 | 10/2006 | Allen et al. |
| 7,454,370 B2 | 11/2008 | Baril et al. |
| 7,831,475 B2 | 11/2010 | Baril et al. |
| 8,446,449 B1* | 5/2013 | Miller ............. H04N 7/142 348/14.01 |
| 2003/0078793 A1 | 4/2003 | Toth |
| 2005/0171850 A1 | 8/2005 | Yueh |
| 2006/0085265 A1 | 4/2006 | Dietz et al. |
| 2008/0126985 A1 | 5/2008 | Baril et al. |
| 2009/0076920 A1 | 3/2009 | Feldman et al. |
| 2009/0125404 A1 | 5/2009 | Mekonen et al. |
| 2009/0192898 A1 | 7/2009 | Baril |
| 2010/0106607 A1 | 4/2010 | Riddiford et al. |
| 2011/0231266 A1 | 9/2011 | Baril |
| 2012/0263168 A1* | 10/2012 | Petrack ............. H04M 7/1205 370/352 |

(Continued)

OTHER PUBLICATIONS

CNNGO, "Cyber supper: Multi-city virtual dining comes to China", Feb. 7, 2012, retrieved on Apr. 7, 2016 from http://travel.cnn.com/shanghai/eat/china-virtual-dining-concept-399417/, 2 Pages.

(Continued)

*Primary Examiner* — Rokib Masud

(74) *Attorney, Agent, or Firm* — Richard A. Castellano; DNL ZITO CASTELLANO

(57) ABSTRACT

A teledining system is configured to display shared menu information between geographically remote teledining session participants. The teledining system is configured to enable viewing of participant bills by any one or more of the session participants, and payment of bills by a session participant for a geographically remote participant(s).

16 Claims, 8 Drawing Sheets

(56) References Cited

U.S. PATENT DOCUMENTS

2013/0246197 A1* 9/2013 Baril .................... G06Q 20/204
                                                          705/15
2015/0304604 A1* 10/2015 Sharma ................. H04N 7/142
                                                         348/14.02

OTHER PUBLICATIONS

Farlex, "Hilton Hotels accommodates travelers with new life-size conferencing; Virtual meetings are now a reality for distant clients, families or friends who may be thousands of miles apart", Jun. 5, 1996, retrieved on Apr. 7, 2016 from http://www.thefreelibrary.com/Hilton+Hotels+accommodates+travelers+with+new+life-size+conferencing%3B...-a018357670, 5 Pages.

Sullivan, "A twist of virtual to 'let's do lunch'", Mar. 19, 1997, retrieved on Apr. 7, 2016 from http://www.vubeam.pa.msu.edu/brownbag/lunch/lunch.html, 3 Pages.

\* cited by examiner

MENU SHARING SYSTEMS AND METHODS FOR TELEDINING

CROSS-REFERENCE TO RELATED APPLICATIONS

This application is a continuation-in-part of U.S. patent application Ser. No. 13/839,229, filed Mar. 15, 2013, titled MENU SHARING SYSTEMS AND METHODS FOR TELEDINING, the entire disclosure of which is hereby incorporated by reference herein in its entirety.

FIELD OF DISCLOSURE

The disclosure relates to teledining and restaurant networking. In particular, the disclosure relates to systems and methods for creating a virtual single, common, or joined restaurant by networking two or more restaurants at separate geographical locations in real-time. Teledining or virtual dining methods and systems of the disclosure facilitate a multi-restaurant, multi-location or dining experience unifying diners at multiple locations in real-time enabling diners at remote locations to share a common dining experience based on established traditions, such as shared menus and host paying for other diners.

BACKGROUND

Systems and methods for teleconferencing and video conferencing are known. Various readily available systems enable real-time one-way or two-way video and/or audio communication. Teleconferencing systems have been enhanced by telecommunications advancements such as voice-over-internet protocol, and advancements in component and device design, including the introduction of relatively inexpensive and highly functional tablet PC's.

Teleconferencing enables at least two persons in geographically remote locations to communicate with one another, and has been found to be exceedingly useful for business meetings, and communicating over large distances with friends and/or family members. Because it is desirable to conduct, for example, a business meeting while dining, some restaurant and hotel chains accommodate teleconferencing for local guests meeting with remotely located guests at another restaurant or hotel in the chain using related art systems that provide video and audio communication. Many teleconferencing systems and components that are now known or later developed may be implemented for related teleconferencing while dining, or teledining.

For example, U.S. Pat. No. 6,844,893 to Miller et al. discloses a system and a method that combine restaurant services with video-conferencing and multi-media access for diners. Miller discloses a system that uses a number of booths in a number of restaurants whereby each booth can video-conference with each other booth, particularly in different time zones. The local area network of each restaurant is linked to the local area network of each other restaurant forming a corporate intranet for secure exchange of video, audio, and data, including a Point-of-Sale (POS) system data. Food, beverage, and retail operations in each restaurant are controlled by the POS system. Thus, Miller discloses co-locating teleconferencing systems and dining service systems, while also disclosing methods for enhancing dining service specifically by way of the POS system.

Other systems for enhancing dining service are known. For example, U.S. Pat. No. 7,454,370 to Baril et al. discloses an ordering system for a restaurant. The system includes an electronic menu having a series of input devices corresponding to various menu items aligned with the input devices, and a wireless transmitter to send selected menu items to a local receiving device in the restaurant for processing. The system further includes an alpha-numeric keyboard, a non-cash payment device, and a printer for printing receipts. Baril discloses using multiple menus at a same table, and providing the option to pay for the items purchased from other menus at the same table.

Systems and methods for enhancing dining services are generally directed to activities local activities at a particular restaurant. For example, U.S. Patent Application Publication Nos. 2003/0078793 to Toth discloses an enhanced customer-centric restaurant system. The system provides an automated restaurant experience for customers. An access unit that customers use to order food and drinks while seated at the table also allows a table's bill to be paid. The billing screen includes a series of payment buttons which allow the table to decide to pay individually, as couples, as a group, or any similar variations.

SUMMARY

Teledining systems and methods are provided to enhance dining experiences by unifying two or more geographically separate restaurants for a period of time. Systems and methods enhance dining experiences by uniting users that are located at separate restaurants for a period of time through a common teledining experience that joins the various restaurants at which the separated users are located. Systems and methods include menu sharing and/or payment sharing. Systems and methods may be configured to include teleconferencing by way of, for example, video and/or audio teleconferencing. Accordingly, the barriers of distance are eliminated by allowing diners to engage in traditional dining protocols such as discussing and ordering from a shared menu and allowing for one party to pay for the other instantly through a single payment, while actively engaging others through high quality video-conferencing.

In an embodiment, methods may include a method for joining geographically separate users, the users being located in at least two geographically separate dining establishments, including displaying menu information using an electronic display device to a host at a first dining establishment, wherein the menu information includes at least one item or service included on the menu of a second dining establishment. Methods may include displaying at least one item or service included on the menu of the first dining establishment to the guest at the second dining establishment. Methods may include displaying prices for the menu item or service to the host and optionally the guest. Methods may include receiving data and instructions for initiating a teledining session, wherein the guest may join the session; displaying the teledining session status on the display device to the host; and displaying a status of guest attendance on the display to the host.

In an embodiment, methods may include receiving a request from a guest to join the initiated teledining session, the initiated teledining session being pending or in progress. Methods may include receiving data from the guest that is compared with saved data for the initiated session to determine whether the data received from the guest is authenticated; and enabling the guest to join the teledining session depending on whether the received data is authenticated. Methods may include receiving a meal order from a guest; and communicating the meal order to the host at the first restaurant. Methods may include prompting the host to place order based on the communicated meal order. Methods may include receiving the host's approval of the meal order.

In an embodiment, methods may include communicating billing information to the host after the receiving the host's approval; receiving payment information and/or instructions from the host to pay for items billed by the second dining establishment; and causing payment, including at least one of the price of ordered item(s) and/or service(s), gratuities, and taxes, to be made from the host to the second dining establishment. Methods ma y include establishing at least one of an audio or video connection between a host a first dining establishment and a guest at a second dining establishment for teleconferencing during the teledining session. Methods may include prompting the host to view teledining session status information on the device using an audible alarm or visual cue. In an embodiment, the received data may include restaurant location data for comparing with saved restaurant location data optionally selected by a host.

In an embodiment, methods may include displaying teledining session information to the host and/or user. The teledining session information may include information selected from the group comprising: a number of guest(s) at a dining establishment, a number of guest(s) present, an identity of guest(s), an identify of guest(s) present, and an identify of connected dining establishment(s). Methods may include updating the electronic display device with computer-readable instructions. The instructions may include instructions for display a graphical user interface.

In another embodiment, methods for virtual dining may include storing a virtual dining session phone number associated with a virtual dining session identification code in one or more electronic databases of a central server; storing a physical restaurant identification code associated with a physical restaurant in the one or more electronic databases; storing local menu information received from the physical restaurant associated with the unique physical restaurant identification code of the physical restaurant in the one or more databases connected to the central server; storing a mobile device identification code of a mobile device located at or near the physical restaurant associated with the physical restaurant identification code in the one or more databases connected to the central server; causing or facilitating storing the physical restaurant identification code on the mobile device; and communicating the local menu information stored in the one or more electronic databases to the mobile device from the central server based on the unique physical restaurant code being stored on the mobile device for automatically displaying a local menu of the physical restaurant at the mobile device using the central server.

In an embodiment, the physical restaurant may be a first physical restaurant and the mobile device may be a first mobile device, the method including receiving, at the central server, host data from the first mobile device; assigning a phone number and a virtual dining session code for a virtual dining session; generating a first participant identification code based on receiving the host data; storing the host data associated with the first participant identification code in the one or more databases of the central server; storing the first participant identification code associated with the phone number in the one or more databases of the central server; and causing or facilitating storage of the first participant identification code on the first mobile device.

In an embodiment, methods may include displaying, at the first mobile device, the local menu information based on the user input matching or corresponding to the stored virtual dining session code at the first mobile device. In another embodiment, methods may include displaying, at the first mobile device, the local menu information at the first mobile device and initiating a video conferencing session based on the user input matching or corresponding to the phone number input at the first mobile device.

In an embodiment, methods may include processing, at the central server, a request to join a second participant to the virtual dining session from a second mobile device geographically local to the first mobile device along with second participant data and the phone number and the virtual dining session code, the first participant being a host participant, the second participant being a guest participant, the second mobile device storing the physical restaurant code; and causing or facilitating storing a unique second participant identification code and the virtual dining session code on the second mobile device based on the processing to determine that the request includes the phone number and the virtual dining session code.

In an embodiment, the physical restaurant may be a first physical restaurant and the physical restaurant code may be a first physical restaurant code, the methods including processing, at the central server, a request to join a second participant to the virtual dining session from a second mobile device geographically remote to the first mobile device along with second participant data, the phone number, and the virtual dining session code, the second mobile device storing the second physical restaurant code associated with a second physical restaurant that is geographically remote from the first physical restaurant; and causing or facilitating storing a unique second participant identification code and the virtual dining session code on the second mobile device based on the processing to determine that the request includes the remote physical restaurant phone number and the virtual dining session code.

Methods may include displaying, at the second mobile device, the second restaurant menu information based on the user input matching or corresponding to the stored virtual dining session code at the second mobile device. In another embodiment, methods may include displaying, at the second mobile device, the second restaurant menu information at the second mobile device and initiating a video conferencing session based on the user input matching or corresponding to the stored virtual dining session code at the second mobile device.

In an embodiment, methods may include displaying, at the first mobile device, the second restaurant menu information. In another embodiment, methods may include displaying, at the second mobile device, the first restaurant menu information. In yet another embodiment, methods may include processing, at the central server, an order from the first participant based on the first restaurant menu information, or an order from the second participant based on the second restaurant menu; and processing, at the central server, the first participant code or the second participant code, respectively, in association with, respectively, the first physical restaurant identification code or a second physical restaurant identification code associated with the second restaurant, and the virtual dining session phone number; to form a bill for the first or second participant based on the order.

In an embodiment, methods may include the order being a first order, the method including generating, at the central server, a combined bill based on the first order and a second order from another participant that is at a different restaurant than the participant associated with the order, the combined bill stored in association with the session phone number at the central server.

Methods may include processing a payment submission request, at the central server, received from the first participant or the second participant, the comprising storing a unique payment tracking identification code generated and sent by the mobile device. In an embodiment, methods may include submitting the payment request and the unique payment tracking identification code to a third party payment system associated with the first restaurant or the second restaurant. In another embodiment, methods may include causing by the central server prompting, at the mobile device, the first participant or the second participant to submit payment further to the payment request directly to the restaurant, or to the central server or associated payment system for distributing payment to a plurality of different restaurants.

In an embodiment of systems, a teledining system may include an electronic display device configured for displaying menu information to a host at a first restaurant, the menu information relating to menu items and/or services at a second restaurant; and a central server for communicating menu information from the second restaurant to the electronic display device at the first restaurant.

In an embodiment of apparatus, a non-transitory computer-readable medium storing instructions for controlling a teledining system may include causing an electronic display device located at a first restaurant to display menu information related to a second restaurant. Instructions may include causing the electronic display device to display a prompt to join or create a teledining session; causing the electronic display device to communicate a user selection to join or create a teledining session to a central server; and causing the electronic display device to receive menu information related to the second restaurant from the central server.

Exemplary embodiments are described herein. It is envisioned, however, that any system that incorporates features of systems described herein are encompassed by the scope and spirit of the exemplary embodiments.

DETAILED DESCRIPTION

Figure 1:
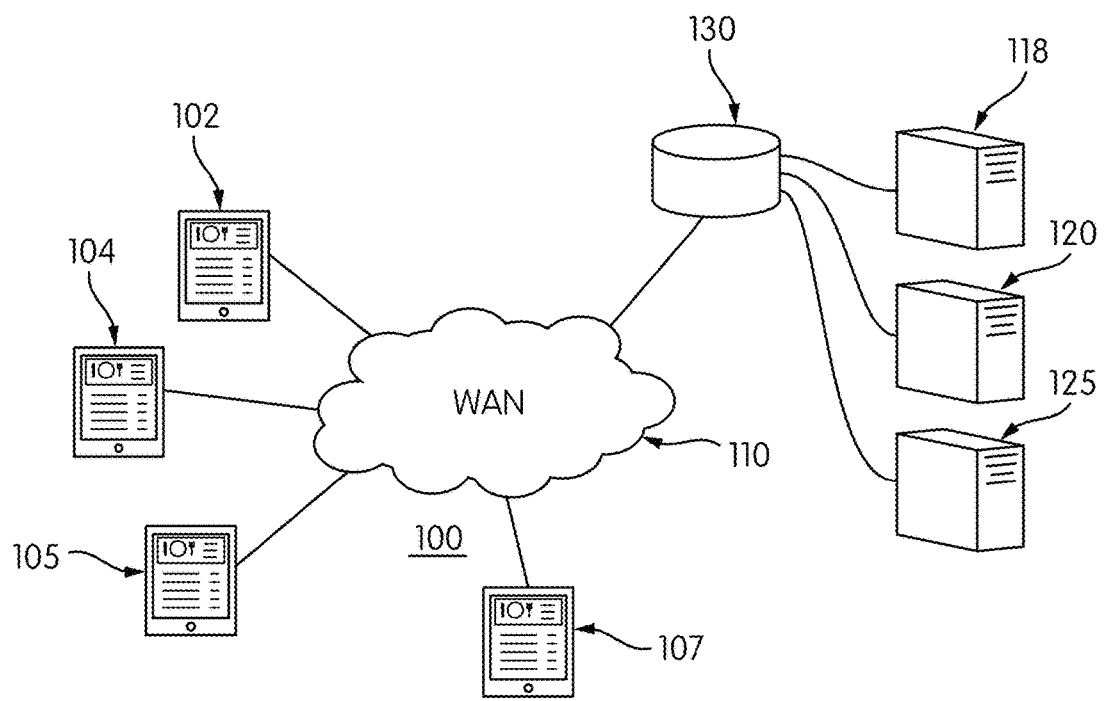
FIG. 1 shows a diagrammatical view of a teledining system in accordance with an exemplary embodiment.

Exemplary embodiments are intended to cover all alternatives, modifications, and equivalents as may be included within the spirit and scope of the apparatus and systems as described herein.

Reference is made to the drawings to accommodate understanding of systems for teledining in accordance with systems and methods of embodiments. In the drawings, like reference numerals are used throughout to designate similar or identical elements. The drawings depict various embodiments of illustrative systems and methods for teledining.

Systems and methods of embodiments accommodate teledining and menu sharing to unify two or more restaurants for a period of time, uniting remotely located guest in one dining experience, and joining two or more restaurants for a common or shared dining experience for users. In particular, systems and methods unify two or more dining establishment such as restaurants, pubs, coffee shops, etc., into a single virtual restaurant for a period of time. The restaurants, pubs, coffee shops, etc., may be co-owned or independently owned and operated. Systems and methods include providing shared menus to the guest(s) and/or host(s). Participants such as host(s) and guests located at the two or more separate restaurants may access multiple menus including a local menu at which the host or guest as located, and a menu of a remote restaurant at which an attendee host or guest is located. The menu (or menus at the table) shows items for sale, such as food, beverages, retail goods, teledining session time, etc. that are available for sale at one or more of the dining establishment(s) participating in the teledining session. For example, a host may choose or suggest a particular dinner for a specific guest located at a geographically remote, but virtually present restaurant during the teledining session.

Menus may be presented to guests to a teledining session in paper form in some embodiments, which an electronic. In other embodiments, menus may be presented to guest(s) and host(s) using an electronic display device. In particular, systems may include an electronic display device such as a table computing device, mobile smart phone device, stationary or mobile personal computer and display systems, or any combination of the myriad of components now available or later developed for enabling network communication, processing of user inputs by way of an input device such as a keyboard or touch screen display, and display to a user of data, which data may include locally generated data, and data received at the device from a remote device connected to by one or more wired and/or wireless local area and/or wide area networks.

The electronic display device may be configured to display a graphical user interface with a look and feel that is unique to a particular restaurant in which it is used. The electronic display device may be connected to a local area network at the restaurant on which a local server is also located for receiving data from and providing data to the electronic device. Alternatively, or additionally, the electronic device may be configured to communicate with a remote server by way of at least one wired and/or wireless wide area network for sending and receiving data such as menu data, teledining session data, software updates, etc.

For example, the data communicated between components of the network include menu information of connected restaurants or other dining establishments, teledining session information such as attendee identification and contact information, session or room locations (restaurant access locations at which reservations for dining are made), dates and times, pricing, billing, payment information and instructions, including data necessary for effecting online transactions for payment from one or more attendees to one or more restaurants using systems now available and later developed for accommodating online electronic transactions.

Systems may include a central server. The central server may be located at any one restaurant among a plurality of restaurants having local electronic menu display devices, or located at a separate geographically remote location and connected to the teledining network. The central server may hold management software and teledining session records. The central server may include a database of restaurants, associated restaurant ID's, address, phone, email, directions, and menu information, which may be updated as desired, or at periodic intervals. The teledining session records may include payment information, records of all billings and payments, records of all room or session numbers or similar identifier, host names, etc.

In systems of some embodiments, teledining systems may be connected to or may incorporate a component of now available or later developed third-party billing systems capable of tabulating purchases, generating invoices, distributing payments, and/or accommodating online transactions. Systems and methods of embodiments may accommodate payment sharing. In particular, systems and methods of embodiments may be configured to accommodate payment by at least one participant of a teledining session of at least one other geographically remote participant's bill. Systems may be configured to enable payment in any currency, automatic distribution of payment and tips, automatic payment of local service charges, taxes, and other items or services that are typical of, e.g., lunch or dinner meetings that are held in a single geographical location, in the same room or session, or at the same table. Systems and methods enable intuitive teledining management with menu sharing and/or payment sharing, and a user experience that provides a feel of meeting with guests in a single restaurant, despite the physical distance between attendee guest(s) and/or host(s) at separate dining locations.

Each dining location may have at least one tablet device, for example, which is loaded with software configured for providing a graphical user interface that is unique to the dining location at which the tablet device resides. A user may enter a restaurant and access the device. The device may be configured to display a prompt and interface for inputting an instruction for joining a room or session as a guest, or creating a room as a host for other guests to join. If the user logs in as a host, the device may be configured to prompt the user to enter a room name or session code, host name, and password, for example, for a new session. The session information may be provided to invited guests, for example, for logging into the teledining system upon arrival at a dining establishment that is equipped for using teledining systems in accordance with embodiments.

After initiating a room or session, the device may be configured to enable access to the room or session by displaying an interface presenting menu data. For example, the menu of the local restaurant may be displayed by the device. The device may be configured to enable the user to cause the device to display menu data corresponding to restaurants at which guest(s) to the teledining session are located. The menu data may be obtained from a local server or a central server as described above. The device may also be configured to enable users to cause the device to view billing data, guest and attendee data, session data including attendance data, time data including time remaining in current session, interfaces for initiating teleconferencing in suitably configured systems that enable teleconferencing by way of video and/or audio, and other options that are useful for menu sharing to unify two or more restaurants for a period of time.

The menu may show menu items available at each respect location, and may display such items to both users. The menu of each restaurant may be viewable as separate and distinct menus that are separately selectable by the guest(s) and/or host, or as one combined menu, depending on the configuration of the graphical interface(s) and the device configuration as operated according to corresponding computer readable instructions. The menu interface may be configured, for example, to enable a physical rather than virtual look and feel, including page-turn appearance, photographs of entrees, pricing, current chef, manager, etc. The menu data for each device at each restaurant may be updated from a local server at each restaurant and/or from a central server.

The host may select an audio and/or video-teledining option if the systems used by both the host and remotely connected guest are suitably equipped with video teleconferencing equipment now known or later developed. For example, now known or later developed voice-over-internet protocol systems and internet video conferencing systems that are readily suitable for use on personal mobile devices may be used in combination with menu sharing in teledining systems and methods of embodiments. Video and/or audio teleconferencing may be selectable as a purchasable add-on to a teledining session, the option being presented to the guest(s) and/or host at the display device.

After guests log into a teledining session, orders may be submitted. Systems may be configured to enable display of guest orders to the host. Systems may be configured wherein the host may be prompted to approve menu orders, after which the orders at each respective restaurant may be submitted for preparation. When a meal is complete, and a teledining session is about to end, the host may pay for all session participants, or selected participants. Systems may be configured for payment to be distributed automatically to select restaurants, for example, including payment for items, services, tips, taxes, etc.

FIG. 1 shows a teledining system in accordance with an embodiment. Individual system components are known, although later developed system components may implemented for forming systems while in accordance with embodiments. FIG. 1 shows a teledining system network 100 having a plurality of teledining display device systems 102, 104, 105, and 107. Each device system 102, 104, 105, and 107 may include one or more display devices located at respective restaurants. For example, device system 102 may include a device configured to display menu information pertaining to the restaurant at which system 102 is located, and menu information pertaining to one or more of the respective restaurant locations at which display device systems 102, 104, 105, and 107 are located. Each device system may include one or more tablet computing device that is configured to display menu information, for example, each device system being located at a geographically separate dining location.

If a host accesses a display device system 102 to connect with a guest at system 104, the session may be enabled by displaying menu information for the restaurant at which the guest is located, and menu information for the local restaurant at which the host is located. The guest may be provided with a paper menu or an electronic menu. Systems may optionally be configured to enable guests to see remote guests and host menu information. Systems may be configured so that any two or more of systems 102, 104, 105, and 107 are enabled for video and/or audio communication using, for example, appropriately configured teleconferencing components.

The display device systems 102, 104, 105, and 107 may be connected to and/or by a wide area network 110, for example, or other wired and/or wireless networks. The network components may be operably connected using wired or wireless connections, or a combination thereof. The teledining system network 100 may include a teledining restaurant database 118, a restaurant menu database 120, and a teledining session and payment database 125, an online billing/payment system software module, for example, and other databases as desired such as a database of videoconferencing channels, etc.

The display devices may be configured to communicate with a central teledining server 130. For example, a host teledining display device 107 may communicate with the central teledining server 130 to initiate a teledining session with one or more of the remote device systems 102, 104, and 105. The central teledining server 130 may query the restaurant database 118 to confirm restaurant registration with a teledining system before attempting connection. The central teledining server 130 may also provide menu information for one or more connected teledining systems to a requesting host teledining system, the menu information being stored in the menu database 120, which communicates with the sever 130.

Alternatively, in some systems, menu information may be communicated directly between restaurants for menu sharing during a teledining session. Also, payment information may be communicated directly between participating restaurants in suitably configured systems. In some systems, menu information may be stored at a server located at one or more of each respective device system for each respective dining location. A device may be updated with new configuration instructions, including interface data, and menu information from a local server and/or a central server.

The central teledining server 130 shown in FIG. 1 may retrieve teledining session information such as teledining session party identification, scheduling information, etc. stored on the session and payment database 125, and provide the information to a requesting host system. A host teledining system may receive and view a bill a related to a party teledining system from the central teledining server 130, and may effect payment of a bill related to the party teledining system by way of the teledining server 130.

Figure 2:
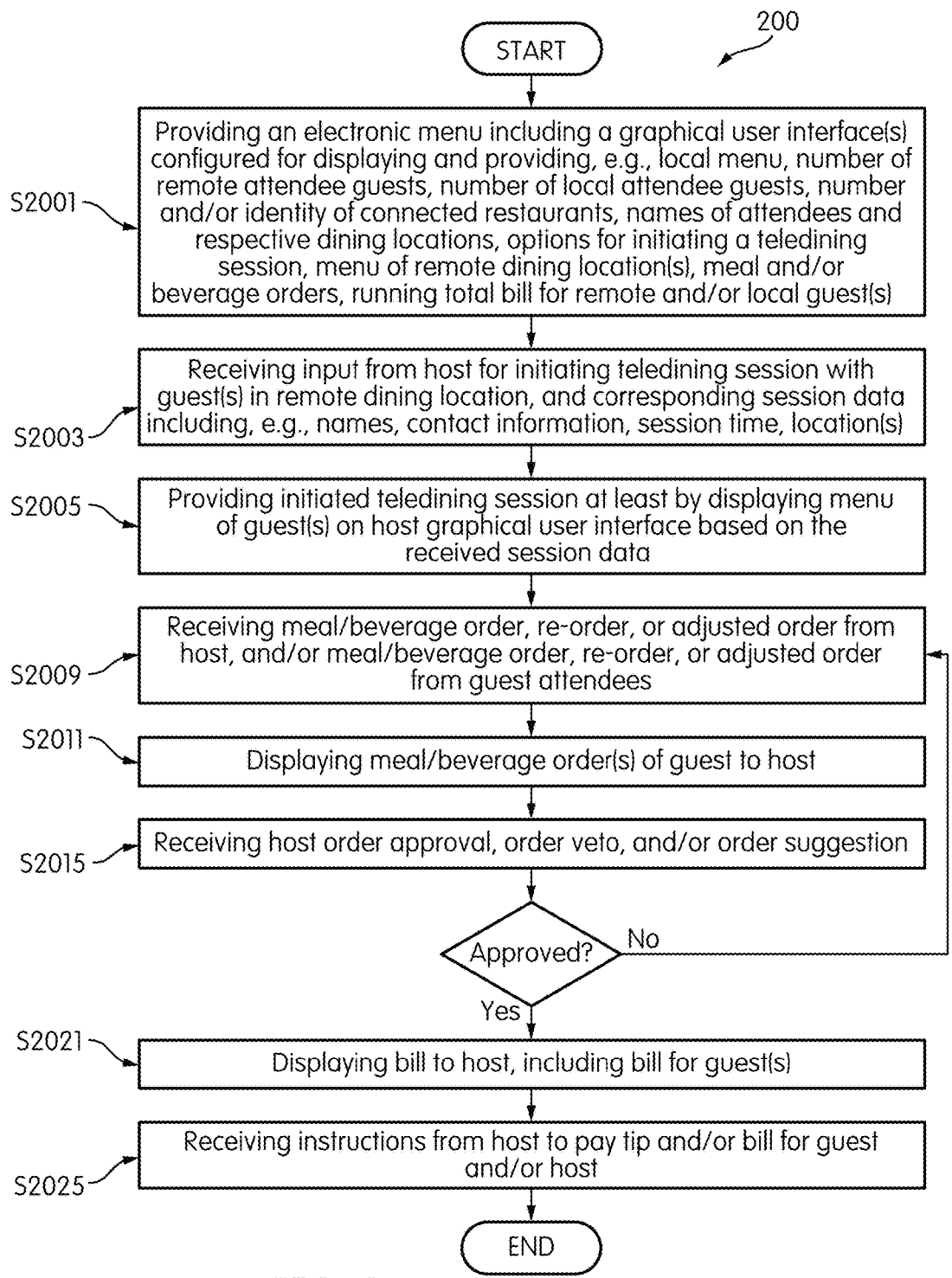
FIG. 2 shows methods for accommodating shared-menu teledining hosting in accordance with an exemplary embodiment.

FIG. 2 shows methods for teledining in accordance with a preferred embodiment for menu sharing to join or unify at least two dining locations. In particular, FIG. 2 shows a teledining process 200. Process 200 includes providing at S2001 an electronic menu including a graphical user interface(s) configured for displaying and providing, e.g., local menu, number of remote attendee guests, number of local attendee guests, number and/or identity of connected restaurants, names of attendees and respective dining locations, options for initiating a teledining session, menu of remote dining location(s), meal and/or beverage orders, running total bill for remote and/or local guest(s). Teledining may include shared payment, and may optionally include video and/or video teleconferencing system components and methods. A teledining or virtual restaurant session may include allowing enabling and disabling of video communications, and filtering of menus items displayed to one or more participants of a virtual dining session.

Methods may include at S2003 receiving input from host for initiating teledining session with guest(s) in remote dining location, and corresponding session data including, e.g., names, contact information, session time, location(s). Input may be received by way of any now available or later developed input systems and methods such as keyboard, touch screen, etc. Methods may include at S2005 providing initiated teledining session at least by displaying menu of guest(s) on host or a guest graphical user interfaces based on the received session data. Local and remote menu information may be displayed to the guest on the device. For example, the user may be presented with a navigable user interface that enables selection of icons representing local and guest menus.

Methods may include at S2009 receiving meal/beverage order, re-order, or adjusted order from host, and/or meal/beverage order, re-order, or adjusted order from guest attendees. At S2011, methods may include displaying meal/beverage order(s) of guest to the host. Methods may include displaying order information of the host to the guest. Methods may include at S2015 receiving host order approval, order veto, and/or order suggestion. The host may, for example, approve or confirm host and/or guest, after which the various restaurant(s) for which orders were submitted may proceed to satisfy the order(s) by, for example, preparing food and/or beverages. For example, the device may be configured to prompt the host to cause the system to place an order with one or more of the connected restaurants. In some embodiments, the user may be provided with an option to veto or override a particular order.

Orders may be placed at a same time, or at separate times. Orders may be adjusted. Activities and status of guests, and teledining session status and information may be displayed to users during a teledining session at respective display devices. After meals are served, and the orders are complete, methods may include at S2021 displaying a bill to the host. The bill may include charges incurred by the host, and may include charges incurred by the guests.

Methods may include enabling the host to pay for one or more guest(s)' charges as desired. Systems may be configured to enable electronic payment of food, beverage, service charges, including teleconferencing charges, etc. In some embodiments, methods may include displaying billing information to one or more guests. Methods may include receiving at S2025 instructions from the host to pay tip and/or bill for guest and/or host. The session may end at a desired time. For example, systems may be configured to prompt the host to end the teledining session, and guests may log on/out at any time as desired. Methods may include displaying to a host or guest options for ending and/or leaving, joining, creating presently or in the future, a teledining session.

Figure 3:
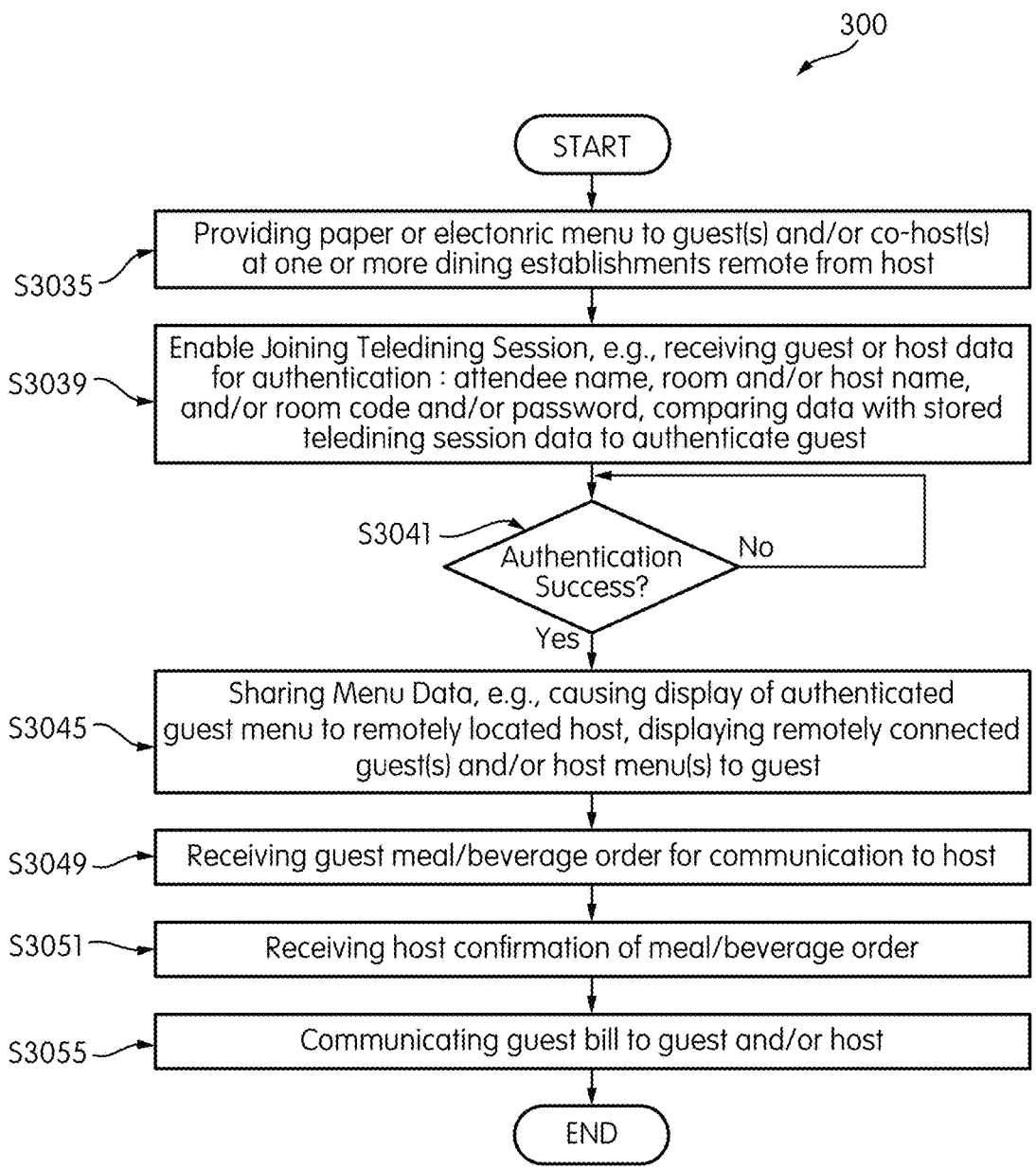
FIG. 3 shows methods for hosting teledining session in accordance with an exemplary embodiment.

FIG. 3 shows an embodiment of methods for guest participation in a teledining session in accordance with an embodiment. In teledining method 300, a guest or co-host accesses a dining establishment that is equipped and configured with teledining display system in accordance with an embodiment. Optionally, in alternative embodiments, guests may have paper menus, and only the host may see various menus of connected guests. Methods as shown in FIG. 3 may be implemented with teledining systems such as those shown in FIG. 1. Systems may be operated in accordance with methods to enable shared menu teledining, optionally including payment management for paying on behalf of connected guest(s) using electronic or online payment/transaction systems now known and later developed, e.g., third-party online transaction platforms, and optionally combined with teleconferencing systems and methods.

For example, methods may begin with a guest or co-host accessing a restaurant or other dining establishment, and being provided with a paper or electronic menu at S3035. The guest may access the teledining system. If a teledining room or table or session has already been initiated, the teledining system may enable access to the teledining session at S3039. A guest may join an initiated or scheduled teledining session by inputting data into the teledining system at a suitable connected user interface, the data including, for example: attendee name, code identifying the session, table, or room and/or host name, and/or room or session code, and/or password. If such data is authenticated at S3041, the system may enable the guest to join the initiated teledining session.

At S3045, the guest may participate in the teledining session wherein a common menu is shared among geographically remote attendees, optionally along with single billing, pricing, and payment data as desired. For example, a guest may place a meal order at S3049. Before the teledining session ends, a geographically remote host, having viewed the shared menu, pricing, and final bill, may pay the guest's bill, including tax and tip, with currency conversion being automatic, or handled by known methods.

At S3051, methods may include receiving host confirmation of meal/beverage order, and the meal(s) and/or beverage order(s) may be prepared by each restaurant as appropriate. As a meal ends, or at any time during, before, or after a teledining session, methods may include at S3055 communicating billing information to guests and/or the host. In particular, systems may be configured to display a running bill total during the teledining session to the host. The host may approve payment for selected guests, and cause payment to be made to respective restaurant for items, services, gratuities, etc. Guests may communicate with other guests and with the host. For example, guests may contact the host to indicate that a new local guest has arrived and that an order needs to be adjusted. The host may be prompted by an audio and/or visual cue to receive the guest communication.

Embodiments enable two or more geographically distant restaurants to become a single virtual restaurant. The virtual restaurant may include combining the menus of the participating restaurants and enable centralized invoicing and payment for patrons at plural of the participating restaurants to remove the barrier of physical distance between concurrently dining patrons at different restaurants and cultivate the illusion that the patrons are dining together at the same restaurant.

As discussed above, embodiments may include further cultivating the single restaurant dining experience by integrating video conferencing. For example, in some embodiments, restaurant owners or patrons may deploy and use now known or later developed suitably configured teleconferencing systems including video conferencing systems and components.

Patrons can join a teledining session or virtual restaurant session as a guest, or initiate or join a session as a host. A patron can accept other guests into a teledining session, and view other guests' menus or enable guests to view menus of other guests or the patron. A patron can remotely control orders of guests, and participants can recommend items to remote guests in the virtual restaurant based on viewing a menu of a restaurant at which the remote guest is located. A bill of a restaurant participating in the teledining session may be combined with bills of other participating restaurants for the session to form a combined bill for the session. A payment status for each patron at each respective participating restaurant may be communicated to the respective restaurant to update local server staff. In an embodiment, virtual dining sessions running with videoconferencing may be configured for control of the video system of one or more patrons by one or more patrons even if patrons are located in different physical restaurants.

Figure 4:
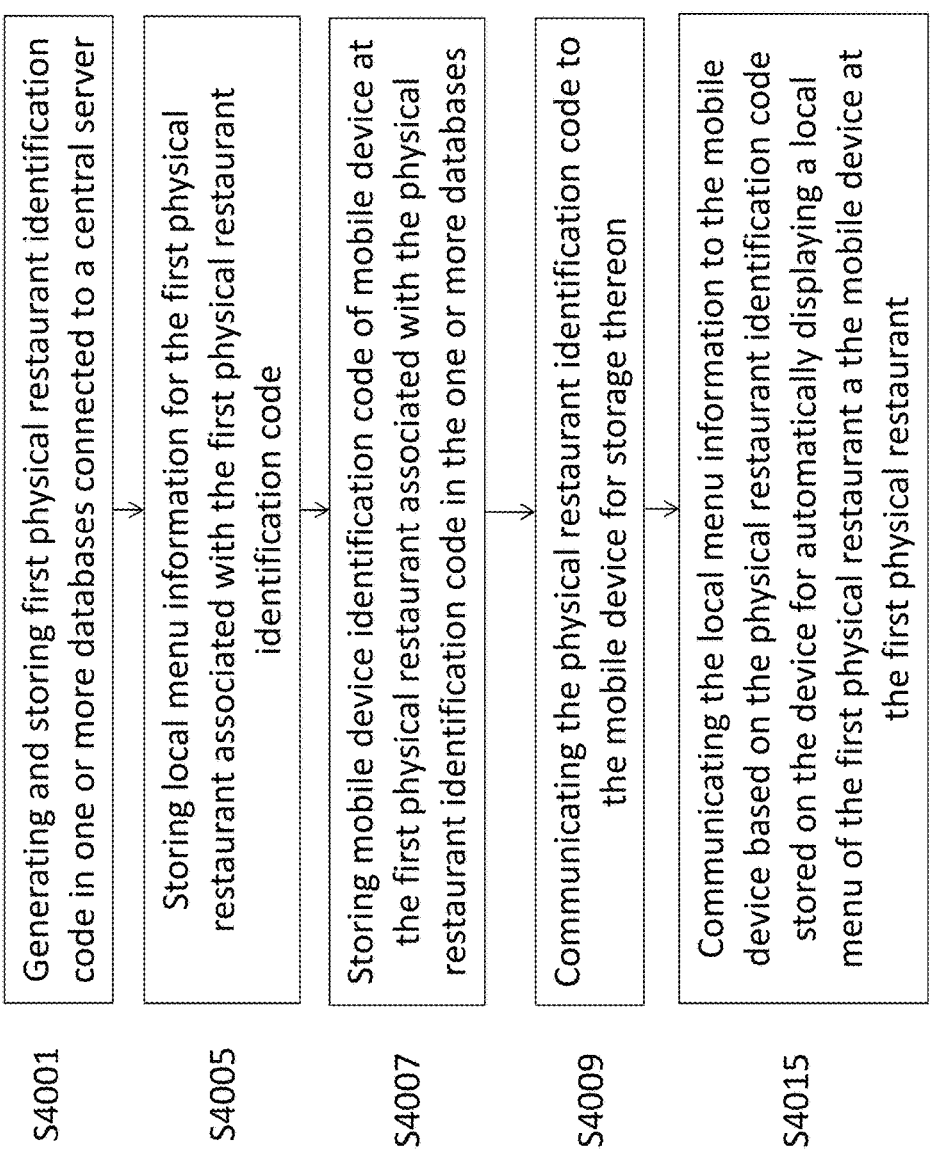
FIG. 4 shows methods for teledining or virtual dining in accordance with an exemplary embodiment.

FIG. 4 shows another embodiment of methods in accordance with an embodiment. In particular, FIG. 4 shows a method 400 for forming a virtual restaurant. Methods may include generating and storing a first physical restaurant identification code in one or more databases of a central server at S4001. This may be performed upon a restaurant creating an account for virtual dining using a system operated using the central server. Menu information from the physical restaurant may be stored at the one or more databases at S4005. Menu information may include pricing, items title and description, and similar information about items and services offered by the physical restaurant, for example.

A mobile device identification code of a mobile device located or associated with the first physical restaurant may be stored in association with the physical restaurant identification code in the one or more databases of the central server at S4007. Accordingly, an electronic device such as a mobile device may be located by the central server using the stored mobile device identification code. The restaurant identification code may be communicated to and stored on the mobile device at S4009. The mobile device may be configured for presenting the menu information of the physical restaurant communicated from the central server at S4015. The menu information communicated by the central server to the mobile device corresponds with the physical restaurant code stored on the one or more databases matching the physical restaurant code stored on the device.

Figure 5:
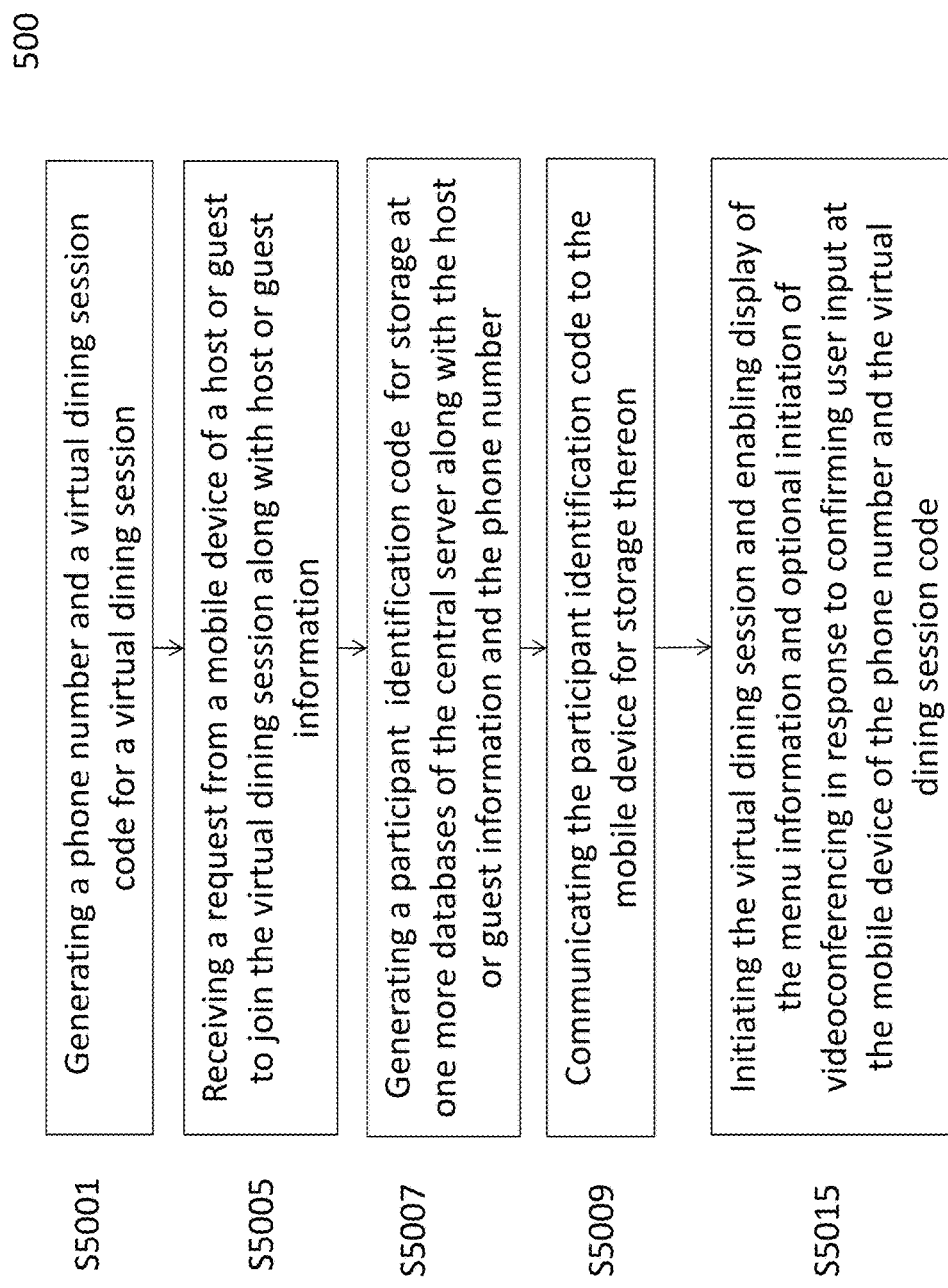
FIG. 5 shows methods for teledining or virtual dining in accordance with an exemplary embodiment.

An embodiment of methods may include providing a virtual restaurant and virtual dining session in accordance with method 500 of FIG. 5. Method 500 may include receiving or generating or assigning a phone number and a virtual dining session code for a virtual dining session at S5001. The phone number may be any code capable of facilitating a unique session identification that is not redundant with codes associated with other active dining sessions. The phone number may be submitted to the central server from a mobile phone, for example, located at a physical restaurant. Accordingly, a participant to a teledining or virtual restaurant session may be placed on a virtual restaurant based on the phone number.

A host or a guest may request to join a teledining or virtual dining session by, for example, entering the phone number into a user interface of an electronic device such as a mobile device located at a first physical restaurant. The mobile device may be, for example, a tablet device dedicated for the restaurant in which the device is located. A participant may be a host or a guest, for example. The host may be a host diner, and the guest may be a guest diner. Virtual dining session may have a plurality of participants, such as host diner that is a first participant, and a guest diner that is a second participant. The request may be communicated by the mobile device to the central server along with host or guest information at S5005. The host or guest information may include, for example, party status information such as host or guest, name, payment information, and other information related to the requesting host or guest for storage on the one or more databases of the central server. Methods in accordance with an embodiment may include notifying a host of a virtual dining session that another participant has joined the virtual dining session after saving the guest information at the central server.

A participant identification code may be generated in response to the request at S5007. The participant identification code may be stored in the one or more databases in association with the host or guest information and the virtual dining session identification code. The participant identification code may be communicated to the mobile device at S5009.

A virtual dining session may be initiated at S5015 by the central server, enabling display of menu information at the mobile device from which the request to join is sent. In an embodiment, the participant may enter the virtual dining session code to gain access to other features of a teledining or virtual restaurant session, including access to teleconferencing or videoconferencing participation, whether passive or controllable. In an embodiment, a requesting participant may only be granted access to view a local menu, and may be blocked from accessing teleconferencing or videoconferencing functions if no code is entered at the mobile device, or if the code entered does not match a virtual restaurant session code communicated to and stored on the mobile device.

Embodiments of systems and methods including methods 400 and 500, for example, include remote payment and payment distribution functions. In an embodiment, payment may be distributed to all physical restaurants within the virtual restaurant using now known or later developed systems. For example, a third party system such as PAYPAL ADAPTIVE PAYMENTS may be used to facilitate a single transaction having up to six receivers, for example, whereby up to six restaurants can be paid at once, and account and transaction status monitoring and control. Each physical restaurant may add a payment system such as a third party system account when establishing an account through the central server of the teledining system. When a payment needs to be completed for one participant located in a specific registered restaurant the central server may be configured to determine the corresponding payment account to designate as a receiver.

For example, when the host or the guest places an order, the mobile device may be configured to send along with the request information including the participant identifier for identifying the participant order. The participant may order items from the restaurant at which the participant is located, or may order items from another restaurant for another person or participant located in another restaurant. Each time an order is placed and approved or auto approved by the system, a bill may be generated, processed, and maintained by the central server may updated automatically for the corresponding participant. The central server may generate a combined bill formed by all individual bills associated with the same virtual restaurant session, such as, for example, those associated with the same virtual dining session code.

In an embodiment, when the host starts the payment process the bill may be locked whereby no more orders can be placed and the host can choose to pay or split payment. Based on host proposals, each participant can pay for himself, pay for a specific participant, or leave the payment responsibility to the host.

When a participant starts the payment process, the mobile device may generate a payment tracking code and send the code to the central server for storage along with information including the paying participant, paid participant, and amount, for example. The system can find for each participant the corresponding payment system accounts of the restaurants it is paying for. The payment code may be sent along with all payment requests to uniquely identify the transaction in payment system.

In an embodiment, the mobile device may be configured to direct the participant for payment using the mobile device after the transaction is created. For example, the mobile device may be configured for accepting payment by credit card. After a payment is made, the central server may update a stored transaction status associated with the transaction. The central server may be configured to identify the transaction payer and payees and can update payment distribution into the central server database based on the transaction code. Payment confirmation may be confirmed for the participant by causing the mobile device to indicate said confirmation in response to a communication from the central server or a third party system.

Systems in accordance with embodiments may include a central server having a plurality of API's interfacing mobile device applications and a website, and communicating with external APIs such as third party payment systems. The central server may be configured with MSSQL Server technology, or similar suitable later developed technology, for maintaining records of session data, video conference data, order data, payment data, and other pertinent material.

Systems may include an electronic device comprising dedicated mobile device located at physical restaurants. Such mobile devices may include tablets, phones, or other electronic devices capable of displaying information to a user by audio or visual presentation.

Systems may include restaurant computers located in the physical restaurant for use by restaurant personnel. For example, the restaurant computers may be configured to enable monitoring of food orders and payment. Systems may include videoconferencing systems located at the physical restaurants with components now known or later developed that are suitable for enabling video communication, audio communication, text communication, or a combination thereof. For example, such communication may be presented in real time to participants of a virtual dining session. The electronic devices, for example, mobile device, may be configured for such communication methods.

Systems may include a payment gateway. The gateway may be an external service provider that processes payment information such as credit card information input by the participant, and effects transfer of money to appropriate accounts. The gateway may be configured to transfer money. The teledining platform may be configured to communicate or include the payment gateway. The platform may include APIs, a mobile application, and a website application, for example. The API's may be located on the central server and include, for example, up to five modules or engines that constitute, respectively, a session engine, menu sharing engine, ordering engine, payment, engine, and website engine. API's may be configured to include service layers for functions including session, menu sharing, ordering, payment, and video, for example.

The website module may be located on the central server and may be configured to enable creating accounts and offering feedback, creating restaurant profiles, updating menu data, viewing customer food orders and payments and transaction data, and viewing reports.

The mobile application may be configured to include five modules responsible for, respectively, constituting a session module, menu sharing module, ordering module, video conference control module and payment module. Each module may communicate with the corresponding engine from the API's. The payment module may communicate with a payment gateway. Payment may be made through a payment system for local or remote restaurants that are part of the teledining or virtual dining network. Payment may be made in parallel for up to six restaurants, or more, per transaction and money may be transferred to restaurants' payment system accounts.

Figure 6:
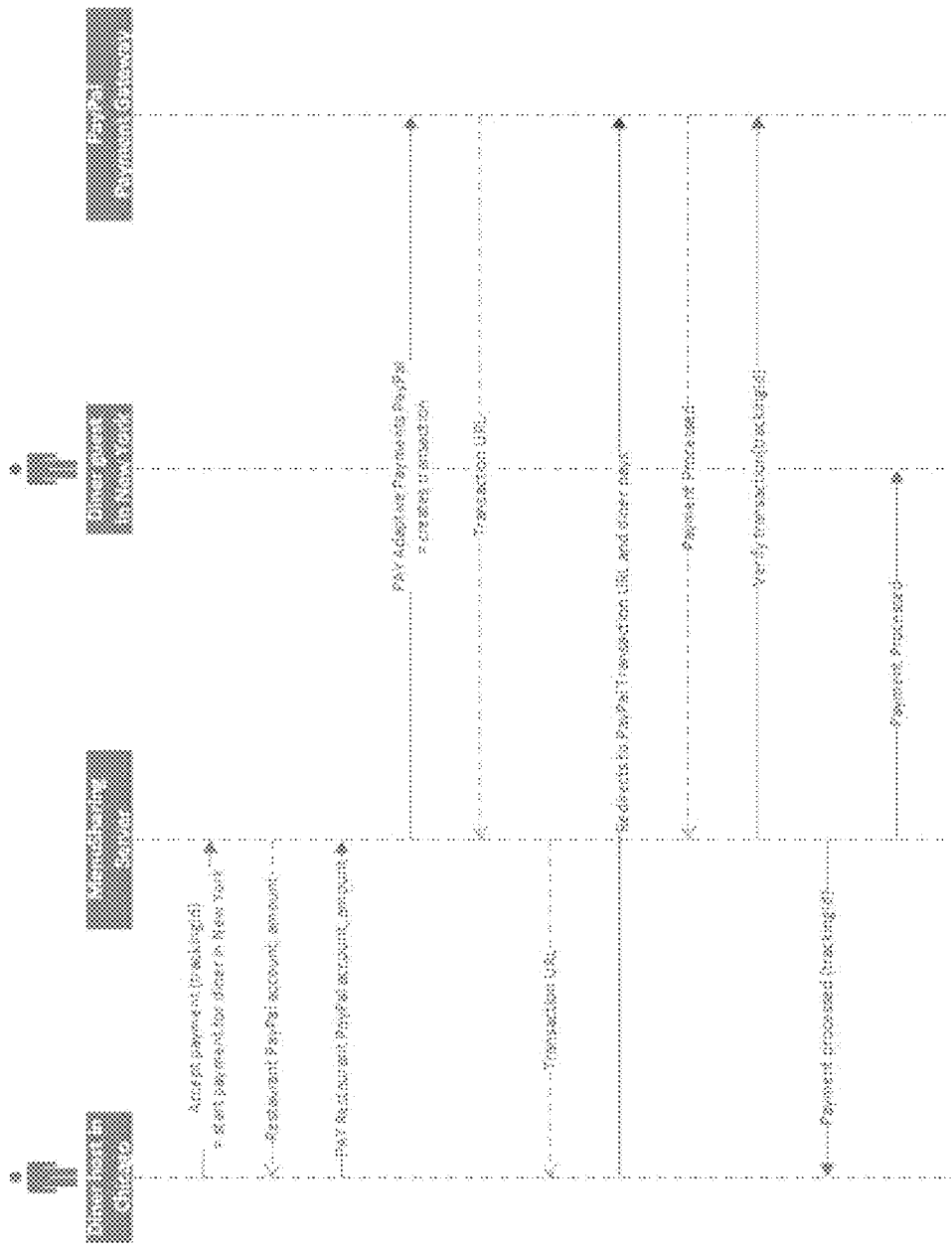
FIG. 6 shows methods for teledining including a payment process in accordance with an exemplary embodiment.

By way of example, in an embodiment of methods as shown in FIG. 6, the payment system may implement a third party system such as provided by PAYPAL. The third party payment system is implemented in a teledining or virtual restaurant system identified as MENUSHARE. In such an embodiment, the PAYPAL accounts and amounts are sent to PAYPAL to create a transaction through PAYPAL Adaptive Payments API Pay method that generates and sends to participants a unique transaction URL. PAYPAL Adaptive Payments API is a product offered by PAYPAL that allows a single transaction to have up to six receivers, enabling payment of up to six restaurants can be paid at once, for example. The payment distribution is made automatically by PAYPAL according to the accounts and amounts received from central server when the transaction was created. The central server may also send its publicly available callback method. PAYPAL may communicate a transaction status to the central server.

After the transaction is created the mobile device redirects the diner to the received PAYPAL URL. On the PAYPAL website the diner may choose to pay through PAYPAL account or with a credit card by entering data and depressing a Pay button or similar feature for confirming payment. The transaction is processed by PAYPAL.

After a payment is made, PAYPAL announces the central server its publicly available callback method that the transaction status changed. The central server may verify the details of the transaction and stores them into the database. Based on the payment unique key of the transaction, the central server can identify the transaction payer and payees and can update payment distribution into the central server database. Push notifications may be sent to the paid participant's mobile device, to the host mobile device and also to the paid restaurants through the MenuShare website to confirm payment.

Figure 7:
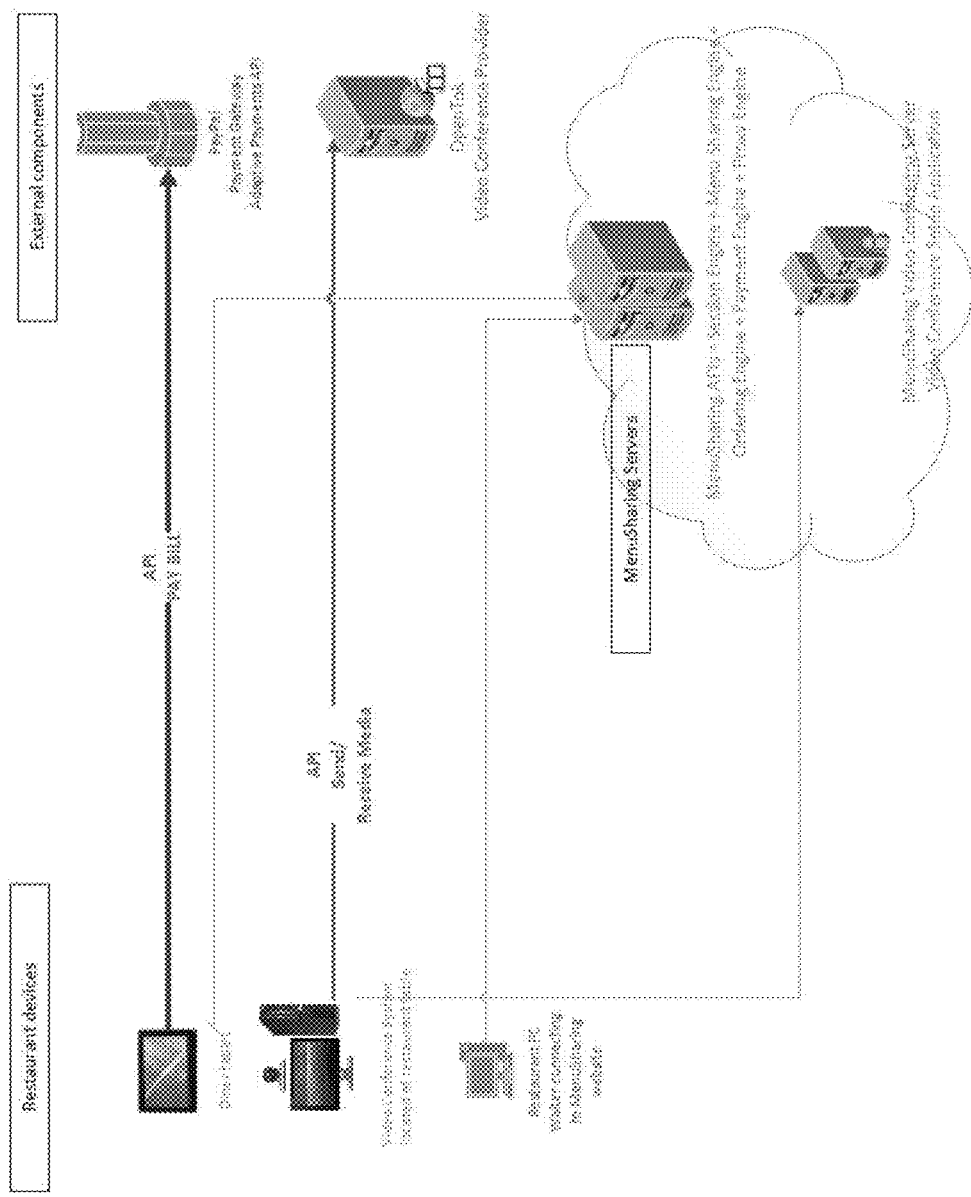
FIG. 7 shows a system for teledining in accordance with an exemplary embodiment.

FIG. 7 shows a teledining system in accordance with an embodiment including a teledining system identified as MENUSHARE. The main components of the system are a MENUSHARE server implemented using .NET SDK, a MENUSHARE website implemented using .NET MVC, an Android mobile application implemented using ANDROID SDK and video conference application implemented using .NET SDK and WEBRTC technology and using streaming services from OPENTOK. The communication between MENUSHARE server and ANDROID mobile application is made using HTTP protocol, JSON format and GCM Communication technology. The communication between the video conference application and clients is based on HTTP through client browsers, JSON format and use publish subscribe mechanism using SIGNALIR technology. Data modifications and actions made through MENUSHARE website or through the MENUSHARE dedicated mobile devices will be permanently persisted into MENUSHARE databases.

The system may be deployed by several or several hundred thousand restaurants worldwide and used by several million restaurant patrons on a daily basis.

Figure 8:
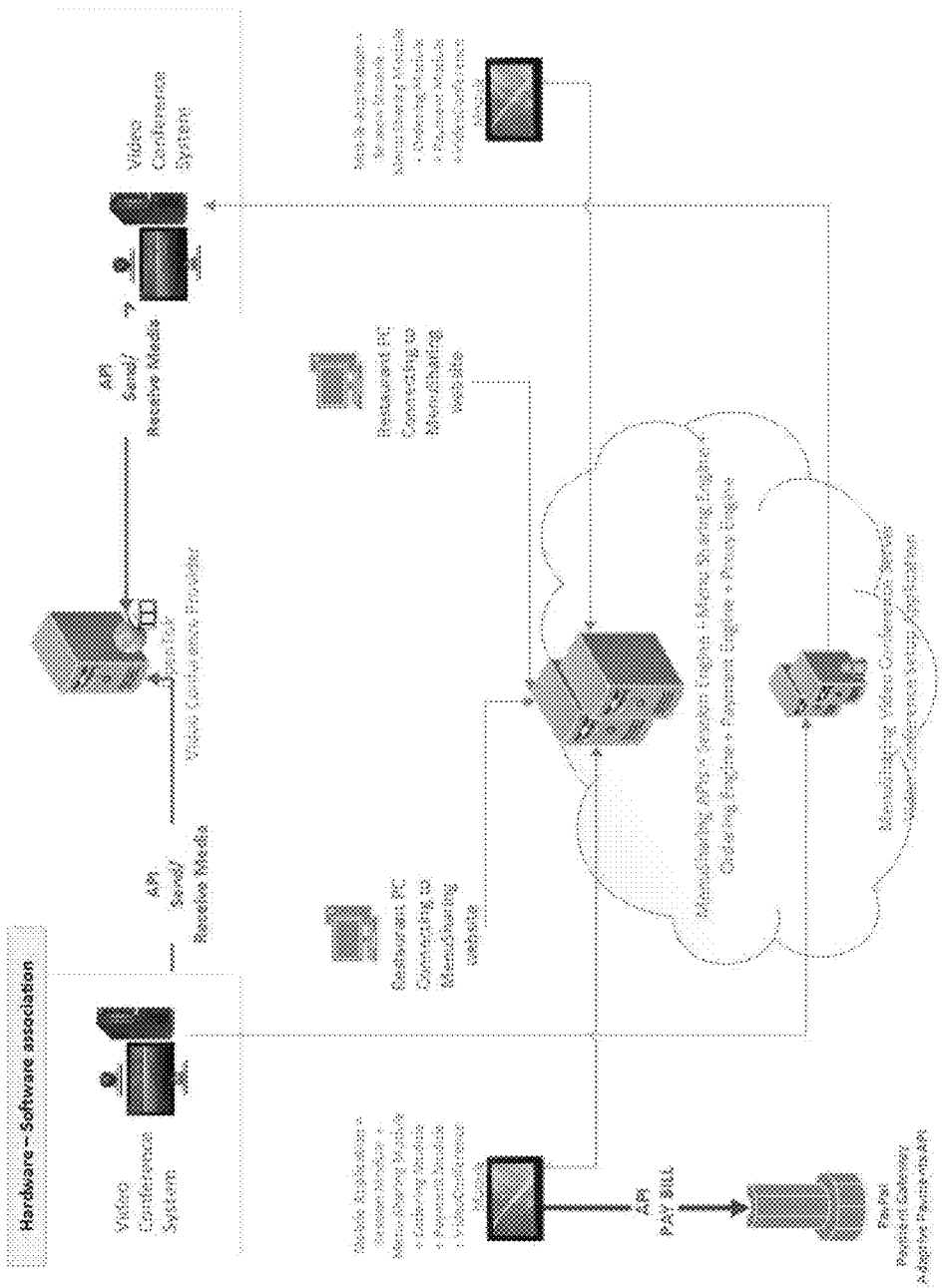
FIG. 8 shows a system of teledining in accordance with an exemplary embodiment.

FIG. 8 shows a teledining system in accordance with an exemplary embodiment. Physical infrastructure of the system consists of MENUSHARE Servers and Databases, dedicated mobile devices (for first version Android tablets), Video Conference Systems located in the restaurant, restaurant computers to connect to MENUSHARE website and external components like OPENTOK Video Conference Provider for video streaming and a PAYPAL Payment Gateway for payment.

The MENUSHARE server may contain several APIs interfacing the mobile devices application and the website and communicating with external APIs like PAYPAL Classic API. MENUSHARE databases may use MSSQL Server technology, and may be located on the MENUSHARE Servers and keep all session data, video conference time related data, ordering data, payment data and other relevant historical data.

Dedicated mobile devices such as tablet devices are located in the restaurants of the MENUSHARE network. A MENUSHARE application may be implemented on the tablet as a publish-subscribe process. The subscriber side resides on Android tablets and the publisher side will operate on MENUSHARE Servers. They will communicate through API and Google Push Notifications Drive API feature.

Restaurant computers may be located in the restaurants and may be used by restaurant personnel to connect to the MENUSHARE website and monitor food orders and payments.

The video conferencing systems may be located in the restaurant and each may be of a microcomputer with screen, microphone and video camera. The configuration may be adaptable to local requirements and also target markets. A restaurant may have one or more such videoconference systems and each will have one or more corresponding mobile device located in the restaurant. The correspondence between mobile device and videoconference system may be preconfigured or may be changed by the waiter from the configuration section from the website. The videoconference system microcomputer will connect to the OPENTOK video streaming provider through WEBRTC compatible web browsers. Client web browsers will connect to OPENTOK API in order to subscribe and publish its video streams and to receive the other participants' video streams.

OPENTOK Video Conference is an external service provider offering API for video streaming. It uses WEBRTC technology that offers real time communication through web browsers. Client browsers connect to each other without the need for additional applications or plug-ins in a secure manner as WEBRTC enforces the usage of encryption for both the media and the signaling.

The payment system may be a PAYPAL Payment Gateway, which is an external service provider that processes credit card data from the diner and transfers money into restaurants' PAYPAL accounts. The PAYPAL Payment Gateway will provide transaction details after processing and the payment status will be updated on MENUSHARE website. PAYPAL Adaptive Payments API may be used to process the payment to enhance the teledining system functionality by facilitating multiple destination accounts for one payment.

The MENUSHARE Platform may consist of following software components: MENUSHARE APIs, MENUSHARE mobile application and a MENUSHARE website application.

In an embodiment as shown in FIG. 8, MENUSHARE APIs use ASP.NET REST API technology located on MENUSHARE servers and consist of five engines each responsible with one functional component of the system: Session Engine, Menu Sharing Engine, Ordering Engine, Payment Engine and Website Engine. Source code is written in .NET 4.5. MenuShare APIs use a layered architecture to provide extensibility and modularity. APIs are composed by service layers for each functional component of the system Session, Menu Sharing, Ordering, Payment and Video. Payment Service offers PayPal integration for transaction creation and verifying transaction status of payments. Video Management Service offers integration with the Video Conference Provider by providing connection parameters to the browser clients. Mobile Notification Service is responsible for mobile communication: sending notifications to connected tablets. A Monitoring Service monitors status of all services status and provides failover by restarting services. A Data Management Layer communicates with the database. A retry mechanism is implemented for transactions at the database access layer, along with being inserted into a queue for later processing. To ensure data integrity, row locks are implemented at database level along with timestamp or checksum of last update. An Infrastructure layer is responsible for logging, SMS and email services.

By way of the example, the MENUSHARE mobile application may run on a tablet device and consist of five modules each responsible for a functional component of the system: Session Module, Menu Sharing Module, Ordering Module, Video Conference Control Module and Payment Module. Each module communicates with the corresponding engine from the MENUSHARE APIs. The Payment Module communicates also with, for example, PAYPAL Payment Gateway. Payment may be made through PAYPAL Adaptive Payments API for local or remote restaurants that are part of the MENUSHARE network. Payment may be made in parallel for up to six restaurants per transaction and money is transferred to restaurants' PAYPAL accounts.

The MENUSHARE website uses ASP.NET MVC technology located on the MENUSHARE Servers and offers functionality to create accounts and offer feedback, create restaurant profile, update menu data, view customers' food orders and payments, and also to view several types of reports.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

It will be appreciated that the above-disclosed and other features and functions, or alternatives thereof, may be desirably combined into many other different systems or applications. Also, various presently unforeseen or unanticipated alternatives, modifications, variations or improvements therein may be subsequently made by those skilled in the art.

What is claimed is:

1. A method for virtual dining, comprising:
storing, using a processor, a virtual dining session phone number associated with a virtual dining session identification code in an electronic database of a central server;
storing, using a processor, a physical restaurant identification code associated with a physical restaurant in the electronic database of the central server;
storing, using a processor, local menu information of the physical restaurant associated with the unique physical restaurant identification code of the physical restaurant in the electronic database of the central server;
storing, using a processor, a mobile device identification code of a mobile device located at or near the physical restaurant associated with the physical restaurant identification code in the electronic database of the central server;
communicating, by electronic transmission from the central server to the mobile device containing the physical restaurant identification code, the local menu information stored in the electronic database based on the unique physical restaurant code being stored on the mobile device;
automatically displaying a local menu of the physical restaurant on the mobile device using the local menu information stored on the mobile device and electronically communicated from the central server;
wherein the physical restaurant is a first physical restaurant and the mobile device is a first mobile device, the method comprising:
receiving, at the central server, host data from the first mobile device;
assigning a phone number and a virtual dining session code for a virtual dining session;
generating a first participant identification code based on receiving the host data;
storing the host data associated with the first participant identification code in the one or more databases of the central server;
storing the first participant identification code associated with the phone number in the one or more databases of the central server; and
causing or facilitating storage of the first participant identification code on the first mobile device.

2. The method of claim 1, comprising:
displaying, at the first mobile device, the local menu information based on the user input matching or corresponding to the stored virtual dining session code at the first mobile device.

3. The method of claim 1, comprising:
displaying, at the first mobile device, the local menu information at the first mobile device and initiating a video conferencing session based on the user input matching or corresponding to the phone number input at the first mobile device.

4. The method of claim 1, comprising:
processing, at the central server, a request to join a second participant to the virtual dining session from a second mobile device geographically local to the first mobile device along with second participant data and the phone number and the virtual dining session code, the first participant being a host participant, the second participant being a guest participant, the second mobile device storing the physical restaurant code; and
causing or facilitating storing a unique second participant identification code and the virtual dining session code on the second mobile device based on the processing to determine that the request includes the phone number and the virtual dining session code.

5. The method of claim 1, the physical restaurant being a first physical restaurant and the physical restaurant code being a first physical restaurant code comprising:

processing, at the central server, a request to join a second participant to the virtual dining session from a second mobile device geographically remote to the first mobile device along with second participant data, the phone number, and the virtual dining session code, the second mobile device storing the second physical restaurant code associated with a second physical restaurant that is geographically remote from the first physical restaurant; and causing or facilitating storing a unique second participant identification code and the virtual dining session code on the second mobile device based on the processing to determine that the request includes the remote physical restaurant phone number and the virtual dining session code.

6. The method of claim 4, comprising:

displaying, at the second mobile device, the second restaurant menu information based on the user input matching or corresponding to the stored virtual dining session code at the second mobile device.

7. The method of claim 1, comprising:

displaying, at the second mobile device, the second restaurant menu information at the second mobile device and initiating a video conferencing session based on the user input matching or corresponding to the stored virtual dining session code at the second mobile device.

8. The method of claim 6, comprising:

displaying, at the first mobile device, the second restaurant menu information.

9. The method of claim 6, comprising:

displaying, at the second mobile device, the first restaurant menu information.

10. The method of claim 8, comprising:

displaying, at the first mobile device, the second restaurant menu information.

11. The method of claim 8, comprising:

displaying, at the second mobile device, the first restaurant menu information.

12. The method of claim 6, comprising:

processing, at the central server, an order from the first participant based on the first restaurant menu information, or an order from the second participant based on the second restaurant menu; and processing, at the central server, the first participant code or the second participant code, respectively, in association with, respectively, the first physical restaurant identification code or a second physical restaurant identification code associated with the second restaurant, and the virtual dining session phone number; to form a bill for the first or second participant based on the order.

13. The method of claim 12, the order being a first order, the method comprising:

generating, at the central server, a combined bill based on the first order and a second order from another participant that is at a different restaurant than the participant associated with the order, the combined bill stored in association with the session phone number at the central server.

14. The method of claim 13, comprising:

processing a payment submission request, at the central server, received from the first participant or the second participant, the comprising storing a unique payment tracking identification code generated and sent by the mobile device.

15. The method of claim 14, comprising:

submitting the payment request and the unique payment tracking identification code to a third party payment system associated with the first restaurant or the second restaurant.

16. The method of claim 14, comprising:

causing by the central server prompting, at the mobile device, the first participant or the second participant to submit payment further to the payment request directly to the restaurant, or to the central server or associated payment system for distributing payment to a plurality of different restaurants.

* * * * *